United States Patent
Tresse (10) Patent No.: US 9,656,404 B2
(45) Date of Patent: May 23, 2017

(54) METHOD AND MACHINE FOR PUNCHING BODYWORK COMPONENTS

(75) Inventor: David Tresse, Polaincourt (FR)

(73) Assignee: Compagnie Plastic Omnium, Lyons (FR)

(*) Notice: Subject to any disclaimer, the term of this patent is extended or adjusted under 35 U.S.C. 154(b) by 501 days.

(21) Appl. No.: 13/699,335

(22) PCT Filed: May 23, 2011

(86) PCT No.: PCT/FR2011/051163
§ 371 (c)(1),
(2), (4) Date: Feb. 4, 2013

(87) PCT Pub. No.: WO2011/148089
PCT Pub. Date: Dec. 1, 2011

(65) Prior Publication Data
US 2013/0127188 A1 May 23, 2013

(30) Foreign Application Priority Data

May 24, 2010 (FR) ..................... 10 54002
May 23, 2011 (FR) ............... PCT/FR2011/051163

(51) Int. Cl.
*B26F 1/02* (2006.01)
*B26D 5/02* (2006.01)
(Continued)

(52) U.S. Cl.
CPC .............. *B26D 5/02* (2013.01); *B26F 1/02* (2013.01); *B60R 19/023* (2013.01); *B26D 5/12* (2013.01);
(Continued)

(58) Field of Classification Search
CPC ........ Y10T 29/49622; Y10T 29/49629; B26D 5/02; B26D 5/12; B60R 19/023; B26F 1/02; B26F 1/40
See application file for complete search history.

(56) References Cited

U.S. PATENT DOCUMENTS 6,305,258 B1 * 10/2001 Henderson et al. .............. 83/13
6,684,479 B2 * 2/2004 Wang .................. B21D 39/031
219/151

(Continued)

FOREIGN PATENT DOCUMENTS

DE 20019775 3/2001
EP 1586427 10/2005
(Continued)

*Primary Examiner* — Richard Chang
(74) *Attorney, Agent, or Firm* — Jacox, Meckstroth & Jenkins (57) ABSTRACT

A method for punching bodywork components, in particular a skin in order to install parking-assistance sensors or headlight washers therein. The invention also relates to a punching machine having an anvil for receiving the bodywork component, a punch, and movement means for moving the punch, initially over a first stroke in order to bring it into a utilization position, and then over a second stroke in order to pierce said component. The movement of the punch over the second stroke takes place at a travel speed not exceeding 10 mm/s and less than the travel speed of the punch over the first stroke. The means for moving the punch over the second stroke comprise a punching actuator coupled to a force-multiplication mechanism. Finally, the invention relates to the use of a machine and to a bodywork component obtained by performing the method.

23 Claims, 4 Drawing Sheets

(51) Int. Cl.
  *B60R 19/02* (2006.01)
  *B26D 5/12* (2006.01)
  *B26F 1/40* (2006.01)
(52) U.S. Cl.
  CPC .................. *B26F 1/40* (2013.01); *Y10T 83/06* (2015.04); *Y10T 83/874* (2015.04)

(56) References Cited

U.S. PATENT DOCUMENTS

| | | |
|---|---|---|
| 7,325,581 B2 | 2/2008 | Braun |
| 7,353,685 B2 | 4/2008 | Martin et al. |
| 2005/0223549 A1 | 10/2005 | Braun |
| 2006/0021526 A1 | 2/2006 | Martin et al. |

FOREIGN PATENT DOCUMENTS

| | | |
|---|---|---|
| GB | 2051651 | 1/1981 |
| RU | 2338645 C2 | 11/2008 |

* cited by examiner

METHOD AND MACHINE FOR PUNCHING BODYWORK COMPONENTS

CROSS-REFERENCE TO RELATED APPLICATIONS

This application is the U.S. National Phase application of PCT/FR2011/051163 filed May 23, 2011, which claims priority to French Application No. 1054002 filed May 24, 2010, which applications are incorporated herein by reference and made a part hereof.

BACKGROUND OF THE INVENTION

1. Field of the Invention

The present invention relates to a method for punching bodywork components for motor vehicles, in particular bodywork skins in order to install parking-assistance sensors or headlight washers therein, the invention also relates to a punching machine, and to the bodywork components obtained thereby.

2. Description of the Related Art

In the present description, the term bodywork component "skin" is used to designate the wall of the component that presents a face that is visible from the outside of the vehicle once mounted on the vehicle. It is common practice to refer to bumper skins, however the invention also relates to skins for fenders or to skirts, where a skirt is a wall extending a bumper downwards, at the front or the rear of a vehicle.

It is common to use ultrasound sensors in order to provide parking-assistance systems, often referred to by the acronym PDC (for Park Distance Control). In the description below, the term "PDC sensor" is used to designate such ultrasound sensors.

As a general rule, PDC sensors are mounted in groups of three, four, or six on a bumper skin or a skirt, being held on the inside of the bumper by a support, referred to as a PDC support, that is secured to the inside face of the bumper skin. The support holds the PDC sensor in register with an orifice made through the bumper skin.

In prior art, mounting a PDC sensor on a bumper skin requires two distinct operations: initially punching the skin in order to form an orifice; and then fastening the support on the skin in register with the orifice. Those two operations are performed at two distinct workstations, and usually after paint has been applied, such that the bumper skin that is handled in order to be subjected to these two successive processes is at risk of being scratched on being transferred to or put into place in each of those workstations.

It should be specified that orifices are not generally formed in a bumper skin during fabrication of the skin itself, since the presence of PDC sensors is an option that is not to be found on all of the commercial versions of the vehicle. The bumper skins are thus all manufactured in a single basic version having no orifices, and PDC sensors are added subsequently, usually after painting.

The same principles apply to headlight washers incorporated in bumper skins.

What is needed, therefore, is a method and machine that improves forming orifices in bumper skins.

SUMMARY OF THE INVENTION

The present invention proposes a punching method that is performed during the step of forming the orifice(s) in the bumper skin.

In order to obtain high quality punching that does not leave any burr after cutting, it is necessary to use a punch that moves slowly, at a speed of about 1 millimeter per second (mm/s), which punch is actuated by a powerful actuator delivering a punching force of the order of 1000 decanewtons (daN) per orifice.

The cost of such an actuator, and of the means required to operate it, go against good optimization of the punching workstation. Furthermore, the amount of room that needs to be available around the component in order to position it without any risk of being scratched requires the punches to be remote from the anvil (i.e. the support on which the piece for punching is placed), thereby increasing the size of the punching workstation while also lengthening cycle time, since the powerful but slow actuators take a long time to travel through the distance separating them from the component.

In one embodiment, the present invention seeks to provide an alternative to having recourse to actuators that are slow and powerful, in order to remedy the above-mentioned drawbacks.

In one embodiment, the present invention provides a method for punching bodywork components, in particular a skin in order to install parking-assistance sensors or headlight washers therein, in which method a bodywork component is placed on an anvil associated with a punch that is held at a distance therefrom when in a rest position, and the punch is moved towards the anvil initially over a first stroke in order to bring it close to the component, and then over a second stroke in order to pierce the component, the movement of the punch over the second stroke being performed at a travel speed relative to the component that does not exceed 10 mm/s and that is less than the travel speed of the punch over its first stroke, wherein the punch is moved over the first stroke with the help of movement means that confer a travel speed on the punch relative to the component of at least 50 mm/s.

One method of the invention is advantageous in that it dissociates the step of approaching the punch from the step of actual punching (referred to herein as "piercing") in which the punch is used.

Thus, assuming that an approach stroke of 300 millimeters (mm) is provided for leaving room around the component in order to avoid scratching it, the movement of the punch from its rest position up to its utilization position takes place in 2 seconds (s) to 3 s, without degrading the quality of the punching, given that the actual punching (i.e. the "piercing") continues to be performed at a slow speed of no more than 10 mm/s.

Preferably, the travel speed during punching is about 1 mm/s and the travel speed during the approach is about 100 mm/s.

Under such conditions, between the moment when the punch begins its first stroke and the moment when it returns to the rest position, the invention makes it possible for the time lapse to lie in the range, from 5 s to 15 s.

The invention may be performed using various movement means. Firstly, it is possible to have recourse to an actuator which travel speed is adjustable and variable. Nevertheless, that solution is not preferred since such actuators are expensive and difficult to adjust.

Another possibility consists in using an actuator having multiple chambers. A first chamber of small section extends over the first stroke so as to obtain a fast travel speed at low power, while a second chamber that is used at the end of the first stroke and that extends over the second stroke produces a travel speed that is low together with power that is high.

In a third solution, the punch is moved over the first stroke with the help of an approach actuator and over the second stroke with the help of means that are distinct from the approach actuator.

The third solution makes it possible to use actuators that are very standard, that are commercially available at moderate price, and that present advantages in terms of supply and of cost.

In order to implement the above-described method, the invention also proposes a machine for punching bodywork components, in particular a skin in order to install parking-assistance sensors or headlight washers therein, the machine comprising an anvil suitable for receiving a bodywork component, a punch that is held at a distance from the anvil when in a rest position, and means for moving the punch towards the anvil initially over a first stroke in order to bring it into a utilization position close to the component, and then over a second stroke in order to pierce the component, the movement means being designed so that the movement of the punch over the second stroke takes place at a travel speed relative to the component that does not exceed 10 mm/s. The movement means are designed so that the travel of the punch over the first stroke takes place at a travel speed relative to the component of at least 50 mm/s.

The machine of the invention may also present one or more of the following characteristics, taken alone or in combination.

The movement means comprise a multiple chamber actuator for the first stroke and for the second stroke.

The movement means comprise an approach actuator for the first stroke and means distinct from the approach actuator for the second stroke.

The movement means comprise a punching actuator for the second stroke.

The punching actuator is coupled to a force-multiplication mechanism.

The force-multiplication mechanism comprises a cam acting as a wedge on a cam wheel secured to the punch.

The force-multiplication mechanism comprises a lever hinged to a pin secured to the frame and actuated by an actuator, the lever exerting a force by the lever effect on a punch support so as to cause the punch to move over its second travel stroke.

The punch is mounted at a first end of an axially-movable column having opposite first and second ends and of length that is substantially equal to the length of the first stroke and that travels along the first stroke in order to place its second end in the vicinity of the force-multiplication mechanism in order to be subjected to thrust from the mechanism over the second stroke.

The force-multiplication mechanism comprises a cam acting as a wedge on a cam wheel secured to the punch.

The punch and the elements that move together with the punch during the first stroke are connected to a counterweight that reduces their apparent weight.

The above-mentioned apparent weight is selected so that the punch and the elements that are movable together therewith move from the rest position of the punch to its utilization position under the effect solely of their apparent weight, the approach actuator serving to return the punch from its utilization position to its rest position, and possibly to adjust the speed of approach.

The approach actuator and/or the punching actuator is a pneumatic actuator.

Finally, the invention provides the use of the machine and also a bodywork component obtained by performing the above-described method.

These and other objects and advantages of the invention will be apparent from the following description, the accompanying drawings and the appended claims.

BRIEF DESCRIPTION OF THE ACCOMPANYING DRAWINGS

In order to make the invention better understood, there follows a description of an embodiment given by way of non-limiting example and with reference to the accompanying drawings, in which.

DETAILED DESCRIPTION OF THE PREFERRED EMBODIMENTS

In FIGS. 1 to 6, the following references are used:

The part numbered 1 is a U-shaped frame on its side, standing on a branch 1a that serves as the base for the frame 1.

The part numbered 2 is an anvil, i.e. a support for receiving a bodywork component that is to be subjected to the punching method. The anvil 2 rests on the base 1a of the frame 1.

The part numbered 3 is a vertical guide rail. Naturally, the orientation of the guide rail 3 depends on the approach stroke of the punch. It is assumed here that the skin (not shown) to be punched is horizontal, but given the often rounded shape of skins, it is clear that other rails (not shown) need to be provided at angles of inclination relative to the vertical.

The part numbered 4 is a movable shelf suitable for sliding along the rail 3.

The part numbered 5 is a pneumatic actuator that operates vertically, having its cylinder 5a secured to the frame 1 by a strip 6, and having its rod 5b projecting downwards from the cylinder 5a and secured to the movable shelf 4 by another strip 7.

Part numbered 8 is a counterweight fastened to the strip 6. In this example the counterweight 8 comprises a reel of a cord 9 urged resiliently towards a retracted position by a helical spring (not visible). The free end of the cord 9 is connected to the strip 7 that is secured to the movable shelf 4. The counterweight 8 serves to compensate for a portion of the weight of the vertically-movable parts, as explained in greater detail below.

The part numbered 10 designates movement means carried by the top branch 1 b of the frame 1. These means 10 comprise:

a horizontal pneumatic actuator 11 (horizontal in this example since it operates in combination with the vertical pneumatic actuator 5) having its cylinder 11a fastened to the branch 1b of the frame 1 and its rod 11b projecting horizontally towards the open side of the frame 1. In an end segment extending over about 20 centimeters (cm), the rod 11b is beveled, i.e. it has a cross-section that is trapezoidal (in a vertical plane parallel to the frame 1) with a short side at the front and a long side at the rear of this section. The long side corresponds to the thickness of the main portion of the rod 11 b where it exits the horizontal pneumatic actuator 11. In this beveled end segment, the bottom face 18 of the rod slopes over a height difference h̲, while its top face (opposite from its inclined face 18) is horizontal;

two guides 12 constituted by short posts having orifices for guiding the rod 11b of the horizontal pneumatic actuator 11, and dimensioned so as to enable the horizontal top face of the rod 11b to remain in contact with the top edge of each orifice so as to be capable of bearing thereagainst; and a vertical column 13 passing through the top branch 1b of the frame 1 and the movable shelf 4 via orifices 14, 15 provided for this purpose in each of them. The top end 16 of the column carries a wheel 17. The column 13 can slide vertically relative to the top branch 1b through the orifice 14, while it is secured to the shelf 4 by being wedged in the orifice 15. Thus, when the shelf 4 and the column 13 move downwards, the wheel 17 is positioned immediately below the front end of the rod 11b of the horizontal pneumatic actuator 11, within the height difference h̲. Once in this position, the wheel 17 runs against the sloping bottom face 18 of the rod 11b if the rod advances between the two guides 12 under drive from the horizontal pneumatic actuator 11, thereby causing the column 13 to move downwards over a height that is slightly less than the height difference h̲ (where h̲ is the maximum that is reached if the wheel meets the front bottom edge of the rod 11b).

At its end opposite from the wheel 17, the column 13 carries a punch 19 (constituted in conventional manner by a die and a stripper) and it thus constitutes a support for the punch 19.

The counterweight 8 compensates for a portion of the weight of the assembly referred to be low as the "movable unit" that is constituted by the punch 19 and the elements that move together with the punch during the first stroke, namely the actuator rod 5b, the shelf 4, the strip 7, the column 13, and the wheel 17, with this applying both when moving downwards and when moving upwards.

The movement means 10 are made safe by a cover 24 that prevents an operator from putting a finger or a hand between the wheel 17 and the rod 11b of the horizontal pneumatic actuator 11 when the horizontal pneumatic actuator 11 is actuated.

There follows a description of the various steps for performing the method.

Figure 1:
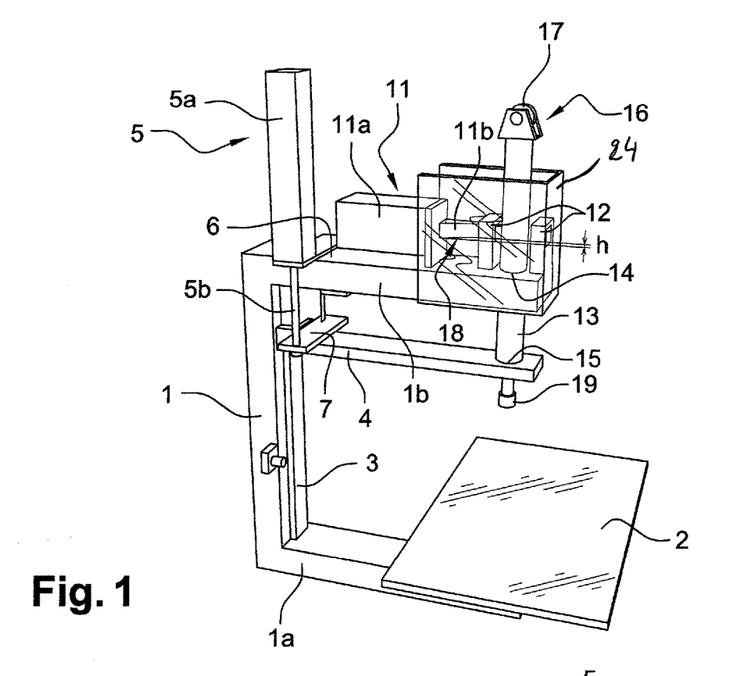
FIG. 1 is a perspective view of a punching machine designed for implementing the method of the invention.
Figure 2:
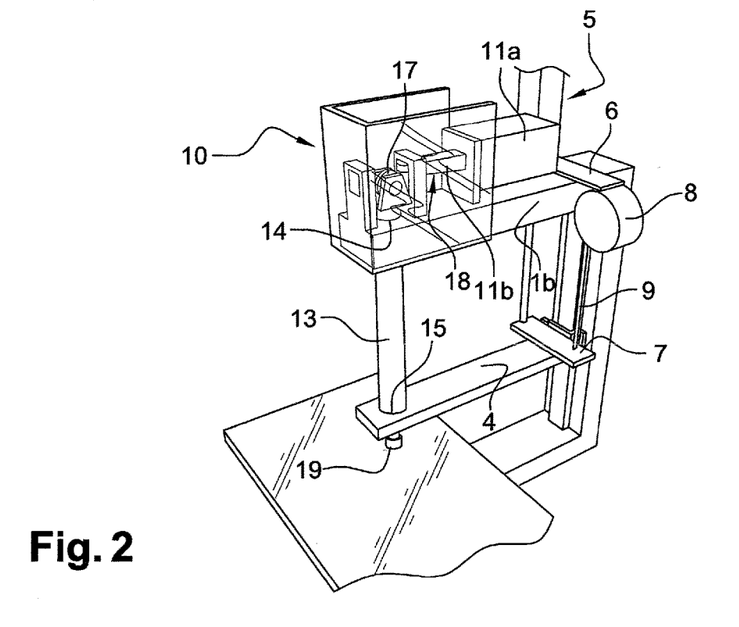
FIG. 2 is a view of the machine as seen from the opposite side and in the position shown in FIG. 3.

FIG. 1: the device is at rest. No actuator is actuated. The shelf 4 is in its high position, as is the column 13.

Figure 3:
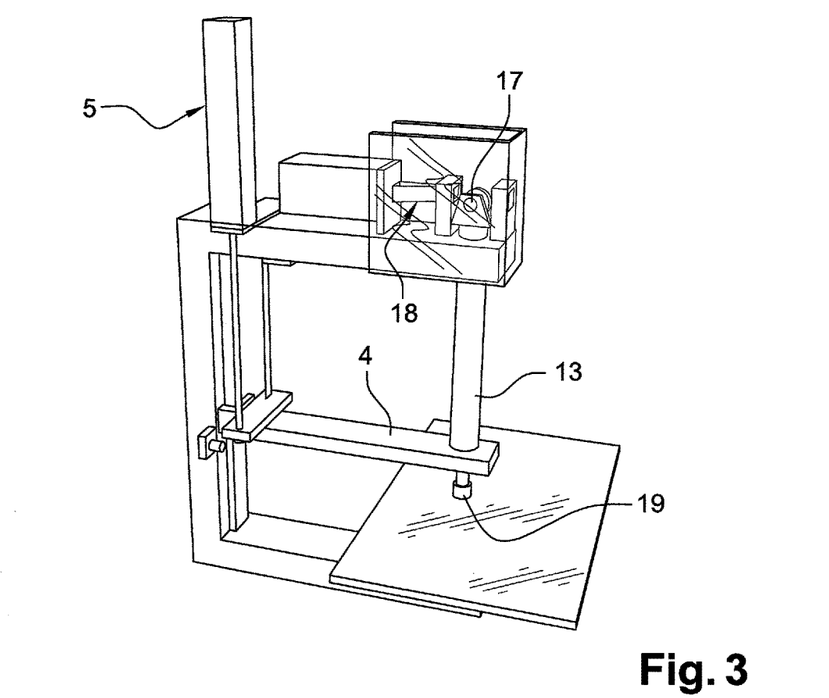
FIGS. 3 to 6 are views analogous to those of FIG. 1 showing the machine in different states as the method progresses.

FIG. 3: the vertical pneumatic actuator 5 has allowed the movable unit to move downwards under the effect of its apparent weight (the result of the difference between its real weight and the weight compensated by the counterweight 8). The wheel 17 faces the sloping bottom face 18 of the rod of the horizontal pneumatic actuator 11. This first movement takes place at high speed, i.e. at 100 mm/s, under the control of the vertical pneumatic actuator 5.

At the end of this movement, the punch 18 should be close to the skin (not shown) of a bodywork component, if such a component were in position on the anvil 2.

It can thus be understood that the vertical pneumatic actuator 5 cannot injure the operator under the effect of its apparent weight. Because of the counterweight 8, the downward movement of the vertical pneumatic actuator 5 is easily stopped by any obstacle encountered by the punch 19 during the first stroke. During this first stroke, the machine is thus safe for the operator since the force with which the punch 19 moves downwards is such that it cannot injure the operator.

Figure 4:
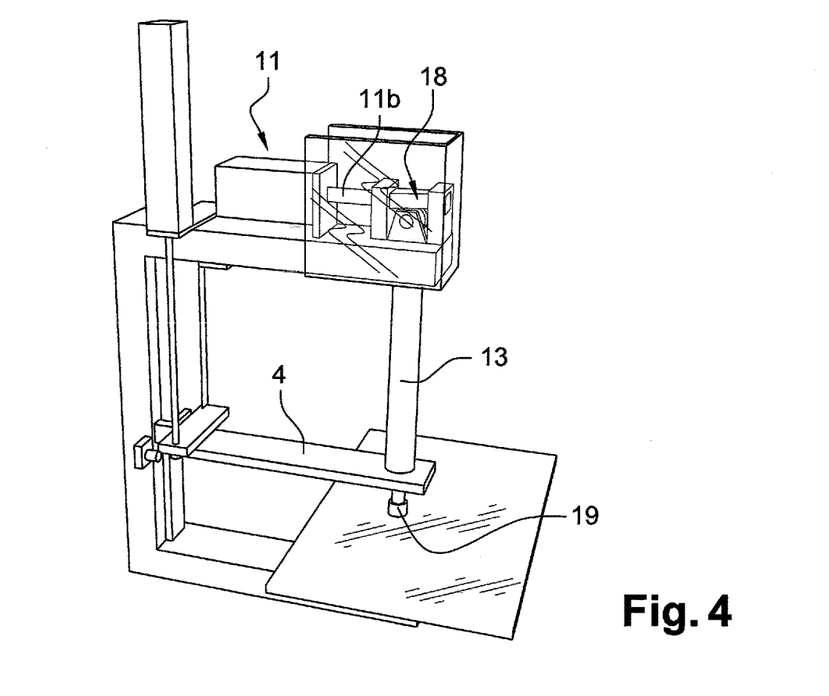

FIG. 4: the horizontal pneumatic actuator 11 has pushed the rod 11b forwards with its top face remaining pressed against the top edges of the orifices in the guide 12 and with its sloping bottom face 18 pushing the wheel 17 downwards, and thus pushing the column 13 together with the punch 19 and the shelf 4 downwards through a small height. This second movement, which corresponds to the piercing operation (actual punching operation) on a bodywork component if present on the anvil 2 takes place at a slow speed, because of the ratio between the horizontal stroke of the rod 11b and the vertical stroke of the column 13. Because of this ratio, the punching power is increased in the same proportion, such that even with a low power horizontal pneumatic actuator 11, it is possible to achieve a sufficient punching power. The assembly constituted by the beveled end of the horizontal rod 11b, the guide 12, and the wheel 17 forms a force multiplier for punching. Any other system could be provided to perform the same function, e.g. a lever arm crank mechanism or a yoke.

It can thus be understood that during the piercing operation, the stroke of the punch is a few millimeters, preferably less than 5 mm. It corresponds at most to the vertical movement through a distance h of the column 13 under drive from the rod 11b of the horizontal pneumatic actuator 11. This distance does not allow an operator to slide a hand or a finger between the punch 19 and the part to be punched. In other words, the punch 19 moves over its first stroke to a small distance from the part to be punched, in which position the wheel 17 faces the sloping bottom face 18 of the rod of the horizontal pneumatic actuator 11 and it is possible to actuate the horizontal pneumatic actuator 11. It can be understood that so long as the wheel 17 is not facing the sloping bottom face 18 of the rod of the horizontal pneumatic actuator 11, the horizontal pneumatic actuator 11 cannot be put into operation. Consequently, this machine enables the workstation to be made safe for the operator who cannot inadvertently be injured by the punch 19 during the piercing operation or while the punch 19 is moving downwards during the first stroke.

Figure 5:
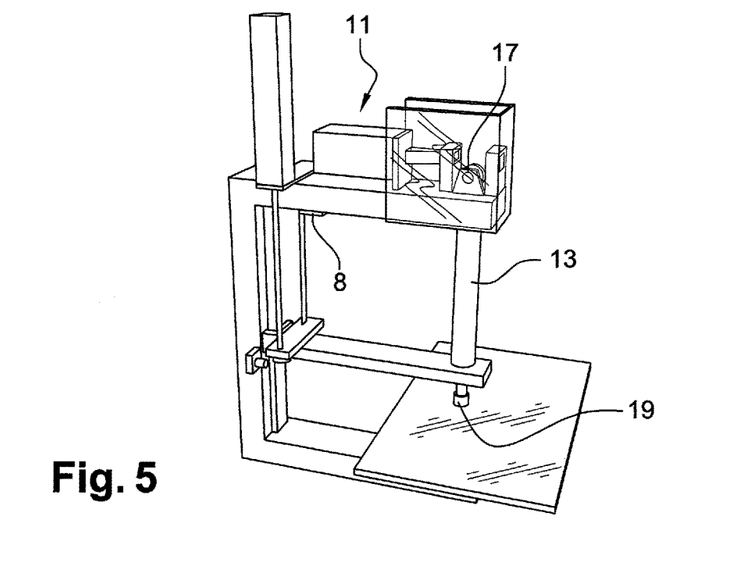

FIG. 5: the horizontal pneumatic actuator 11 returns to the initial position, with the rod 11b retracted.

Figure 6:
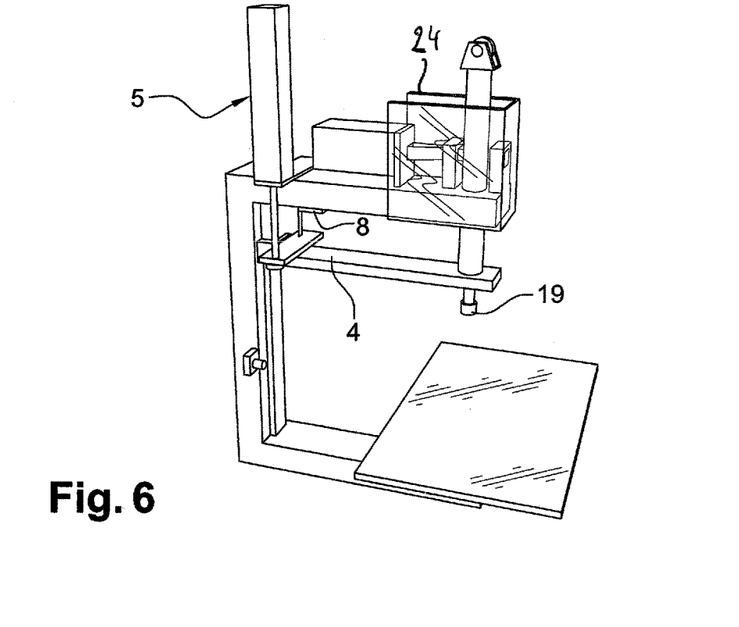

FIG. 6: the vertical pneumatic actuator 5 raises the shelf 4 (and thus also the column 13 and the other components of the movable unit). By virtue of the counterweight, the vertical pneumatic actuator 5 needs only overcome the apparent weight of the movable unit.

It can thus be understood that apart from the stationary protective cover 24, making the punching machine safe does not require any special protection to be put into place in order to protect the operator. As a result, it is possible to reduce the idle time of the machine and to increase productivity, since the operator no longer needs to open and close safety covers, e.g. in order to put a part for punching in the machine and/or in order to remove it. Furthermore, although there is no protective cover to be opened and closed, that does not mean there is any need to put intangible barriers into place. The machine is thus made safe and can be manufactured using elements that are inexpensive.

Figure 7:
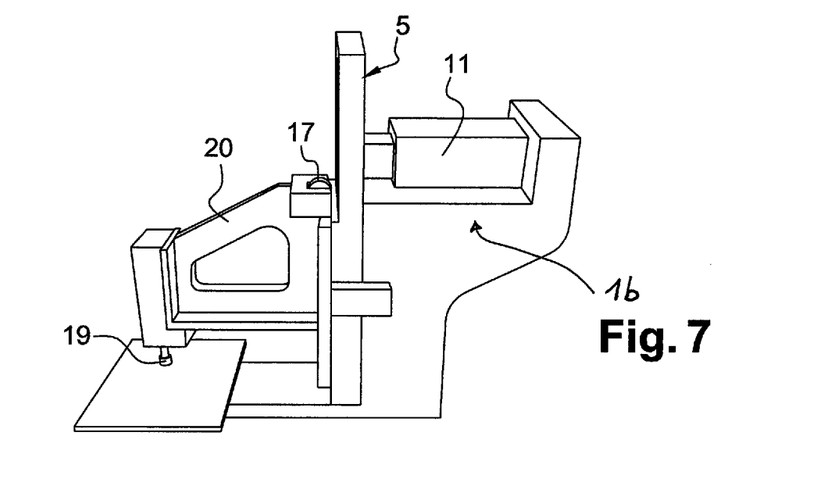
FIG. 7 is a perspective view of a second embodiment of a punching machine designed for implementing the method of the invention.
Figure 8:
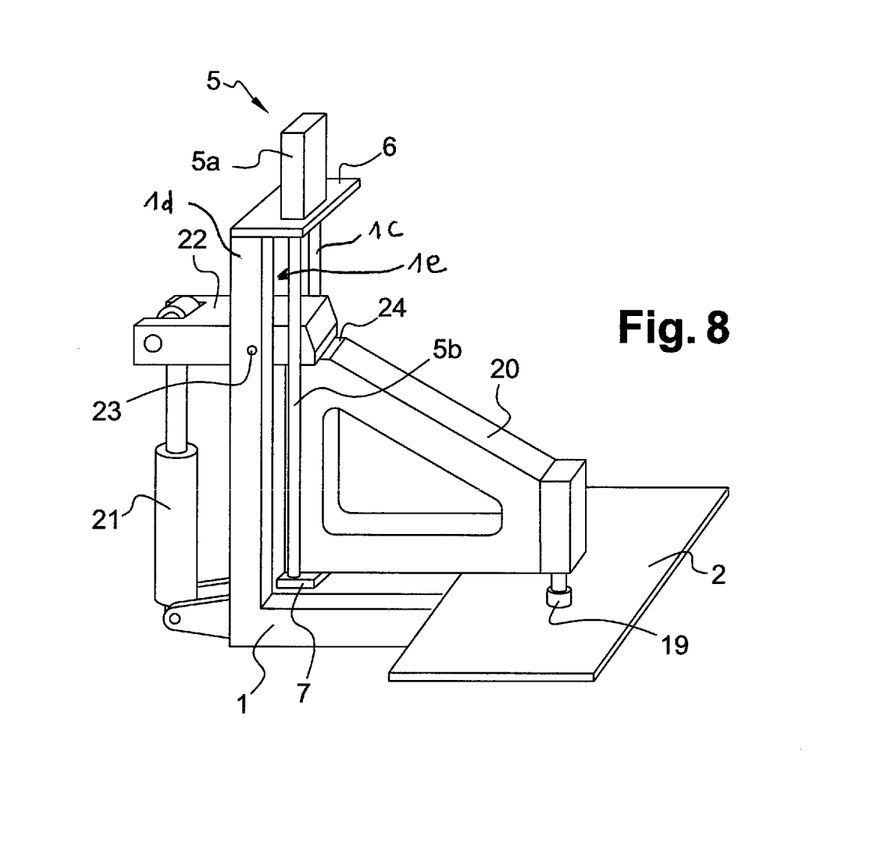
FIG. 8 is a perspective view of a third embodiment of a punching machine designed for implementing the method of the invention.

FIGS. 7 and 8 show second and third embodiments of the installation in which elements that are common to all three embodiments are identified by the same numerical references.

The embodiment shown in FIG. 7 differs from the first embodiment in that the machine does not have a counterweight and in that the vertical guide rail is made up of two vertical uprights 1c and 1d that leave a space 1e between them. The column 13 and the movable shelf 4 are replaced by a support 20 of essentially trapezoidal shape with two parallel sides being vertical. A first vertical side is parallel to the vertical branch of the frame 1 and comprises means suitable for sliding along the rail 3. The second vertical side carries the punch 19, the punch 19 being in the vicinity of the bottom portion of the support 20.

A horizontal pneumatic actuator 11 is fastened to the branch 1 b of the frame projecting on the other side of the support 20 relative to the vertical branch of the frame. The horizontal pneumatic actuator 11 acts on a beveled rod 11b, passing through the space 1e between the two uprights 1c and 1d.

The beveled rod 11b can move horizontally under drive from the horizontal pneumatic actuator 11 towards the punch.

At its top end, close to the vertical branch of the frame 1, the support 20 has a wheel 17 for co-operating with the bottom face of the beveled rod 11b of the horizontal pneumatic actuator 11.

The punching method is identical to that described above. Nevertheless, the movement of the punch 19 over its first stroke is controlled entirely by the vertical pneumatic actuator 5 that positions the wheel 17 facing the sloping bottom face 18 of the rod of the horizontal pneumatic actuator 11.

Advantageously, the vertical pneumatic actuator 5 is a low-pressure actuator. Thus, if during the first stroke the punch 19 encounters an obstacle, the low return pressure exerted on the vertical pneumatic actuator 5 by the obstacle causes the vertical pneumatic actuator 5 to stop or even to move upwards towards its rest position. The contact pressure of the vertical pneumatic actuator 5 is less than 50 newtons per square centimeter ($N/cm^2$).

As in the first embodiment, the machine is safe. The horizontal pneumatic actuator 11 can be actuated only when the wheel 17 is facing the horizontal pneumatic actuator 11. In this position, the punch 19 is at a distance from the component to be punched that makes it possible to be sure that the operator cannot inadvertently slide a hand or some other part of the body between the punch 19 and the part to be punched.

Thus, while the punch 19 is moving under force over its second stroke, the operator cannot be injured.

In the embodiment shown in FIG. 8, the frame 1 is L-shaped, standing on its branch 1a that acts as the base of the frame 1. The vertical branch of the frame 1 has two uprights 1c and 1d that are spaced apart, as in the above-described embodiment. For punching, the movement means 10 comprise in particular a pneumatic actuator 21 connected to a lever-forming part 22 for moving the punch 19 over its second stroke. The lever bears against a rocker pin 23 passing through the two uprights 1c and 1d of the vertical branch of the frame and it exerts vertical pressure on a reinforced surface 24 of the support 20 when the pneumatic actuator 21 pushes the lever-forming part 22 upwards.

The positioning of the rocker pin 23 enables the lever-forming part 22 to be retracted (not shown) from the space 1e between the uprights 1c and 1d so as to allow the support 20 to be slid upwards (relative to FIG. 8) or downwards during the movements of the support 20 over the first stroke (approach stroke).

Naturally, the above-described embodiments are not limiting.

While the method and system herein described constitute preferred embodiments of this invention, it is to be understood that the invention is not limited to this precise method and system, and that changes may be made therein without departing from the scope of the invention which is defined in the appended claims.

What is claimed is:

1. A method for punching a bodywork component, in particular a skin in order to install parking-assistance sensors or headlight washers therein, in which said method comprises the steps of:

placing said bodywork component on an anvil associated with a punch that is held at a distance therefrom when in a rest position;

activating a first actuator to move said punch toward said bodywork component over a first stroke in order to bring said punch close to said bodywork component;

activating a second actuator to move said punch over a second stroke in order to pierce said bodywork component;

said movement of said punch over said second stroke being performed at a travel speed relative to said bodywork component that does not exceed 10 mm/s and that is less than a travel speed of said punch over its first stroke, said second actuator, which is coupled to a force-multiplication mechanism, being distinct from said first actuator;

wherein said punch is mounted at a first end of an axially-movable support that has said first end and a second end opposite said first end, wherein said axially-movable support travels along said first stroke in order to place said second end in a vicinity of said force-multiplication mechanism so that said second end can be subjected to thrust from said mechanism during said second stroke when said punch is moved by said second means;

wherein the movement of said punch over said first stroke by said first actuator over said second stroke by said second actuator is always directed towards the anvil.

2. The method according to claim 1, wherein, after said first stroke, a distance between said bodywork component to be punched and said punch is preferably less than 5 mm.

3. A machine for punching a bodywork component, in particular a skin in order to install parking-assistance sensors or headlight washers therein, said machine comprising an anvil suitable for receiving a bodywork component, a punch that is held at a distance from said anvil when in a rest position, and movement means for moving said punch initially over a first stroke in order to bring it into a utilization position close to said bodywork component, and then over a second stroke in order to pierce said bodywork component, said movement means being designed so that said movement of said punch over said second stroke takes place at a travel speed relative to said bodywork component that does not exceed 10 mm/s and that is less than a travel speed of said punch over said first stroke, wherein said movement means comprise a first means for moving said punch over said first stroke and a second means, distinct from said first means, for moving said punch over said second stroke, and wherein the second means for moving said punch over said second stroke comprises a punching actuator coupled to a force-multiplication mechanism;

wherein said first means for moving said punch over said first stroke and said second means for moving said punch over said second stroke both cause said punch to move towards said anvil;

wherein said punch is mounted at a first end of an axially-movable support that has said first end and a second end opposite said first end, wherein said axially-movable support travels along said first stroke in order to place said second end in a vicinity of said force-multiplication mechanism so that said second end can be subjected to thrust from said mechanism during said second stroke when said punch is moved by said second means.

4. The machine according to claim 3, wherein said first means comprise an approach actuator for said first stroke.

5. The machine according to claim 4, wherein said approach actuator is a pneumatic actuator.

6. The machine according to claim 4, wherein said force-multiplication mechanism comprises a cam acting as a wedge against a cam wheel secured to said punch.

7. The machine according to claim 4, wherein said force-multiplication mechanism comprises a lever hinged on a pin secured to a frame and actuated by an actuator, said lever exerting a force on a support of said punch by a lever effect in order to move said punch over said second stroke.

8. The machine according to claim 3, wherein said force-multiplication mechanism comprises a cam acting as a wedge against a cam wheel secured to said punch.

9. The machine according to claim 3, wherein said force-multiplication mechanism comprises a lever hinged on a pin secured to a frame and actuated by an actuator, said lever exerting a force on a support of said punch by a lever effect in order to move said punch over said second stroke.

10. The machine according to claim 3 wherein said punching actuator is a pneumatic actuator.

11. The machine according to claim 3, wherein said force-multiplication mechanism comprises a cam acting as a wedge against a cam wheel secured to said punch.

12. The machine according to claim 3, wherein said force-multiplication mechanism comprises a lever hinged on a pin secured to a frame and actuated by an actuator, said lever exerting a force on a support of said punch by a lever effect in order to move said punch over said second stroke.

13. The machine according to claim 3, wherein said first means is a pneumatic actuator.

14. The machine according to claim 13, wherein said second means is a pneumatic actuator.

15. The machine according to claim 3, wherein said second means is a pneumatic actuator.

16. A machine for punching a bodywork component comprising:
an anvil suitable for receiving said bodywork component;
a punch that is held at a distance from said anvil when in a rest position; and
a first driver or mover for moving said punch initially over a first stroke in order to bring it into a utilization position close to said bodywork component, and a second driver or mover for moving said punch over a second stroke in order to pierce said bodywork component;
wherein said movement of said punch over said second stroke takes place at a travel speed relative to said bodywork component that does not exceed 10 mm/s and that is less than a travel speed of said punch over said first stroke, wherein said first driver or mover for moving said punch over said first stroke is distinct from said second driver or mover for moving said punch over said second stroke, and wherein said second driver or mover for moving said punch over said second stroke comprises a punching actuator;
wherein said first driver or mover moves said punch over said first stroke and said second driver or mover moves said movement of said punch over said second stroke, wherein said movement of said punch over said first stroke and said second stroke is always directed towards the anvil;
wherein said punch is mounted at a first end of an axially-movable support that has said first end and a second end opposite side first end, wherein said axially-movable support travels along said first stroke in order to place said second end in a vicinity of a force-multiplication mechanism so that said second end can be subjected to thrust from said force-multiplication mechanism during said second stroke when said punch is moved by said second driver or mover.

17. The machine according to claim 16, wherein said first driver or mover comprises an approach actuator for said first stroke.

18. The machine according to claim 17, wherein said approach actuator is a pneumatic actuator.

19. The machine according to claim 16, wherein a force-multiplication mechanism comprises a cam acting as a wedge against a cam wheel secured to said punch.

20. The machine according to claim 16, wherein a force-multiplication mechanism comprises a lever hinged on a pin secured to a frame and actuated by an actuator, said lever exerting a force on a support of said punch by a lever effect in order to move said punch over said second stroke.

21. The machine according to claim 16, wherein said second driver or mover is a pneumatic actuator.

22. The machine according to claim 16, wherein said punch is mounted at a first end of an axially-movable support that has opposite first and second ends and that travels along said first stroke in order to place its second end in a vicinity of said force-multiplication mechanism in order to be subjected to thrust from said force-multiplication mechanism during said second stroke.

23. The machine according to claim 16, wherein said force-multiplication mechanism comprises a cam acting as a wedge against a cam wheel secured to said punch.

* * * * *

UNITED STATES PATENT AND TRADEMARK OFFICE
CERTIFICATE OF CORRECTION

PATENT NO. : 9,656,404 B2
APPLICATION NO. : 13/699335
DATED : May 23, 2017
INVENTOR(S) : David Tresse Page 1 of 1

It is certified that error appears in the above-identified patent and that said Letters Patent is hereby corrected as shown below:

On the Title Page

(73) Assignee, delete "Lyons" and insert --Lyon-- therefor.

In the Specification

Column 10, Line 16, delete "movement of said".
Column 10, Line 22, delete "side" and insert --said-- therefor.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*